(12) United States Patent
Banerjee et al.

(10) Patent No.: US 10,338,655 B2
(45) Date of Patent: Jul. 2, 2019

(54) ADVANCED FALL THROUGH MECHANISM FOR LOW POWER SEQUENCERS

(71) Applicant: QUALCOMM Incorporated, San Diego, CA (US)

(72) Inventors: Sarbartha Banerjee, Bangalore (IN); Manisha Singh, Ghaziabad (IN); Vinay Jain, Bangalore (IN); Venkata Devarasetty, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 15/484,669

(22) Filed: Apr. 11, 2017

(65) Prior Publication Data

US 2018/0292875 A1 Oct. 11, 2018

(51) Int. Cl.
| | | |
|---|---|---|
| *G06F 1/00* | (2006.01) | |
| *G06F 1/26* | (2006.01) | |
| *G06F 13/24* | (2006.01) | |
| *G06F 1/3287* | (2019.01) | |
| *G06F 1/30* | (2006.01) | |
| *G06F 9/38* | (2018.01) | |
| *G06F 1/3203* | (2019.01) | |
| *G06F 1/3206* | (2019.01) | |
| *G06F 9/48* | (2006.01) | |

(52) U.S. Cl.
CPC .............. *G06F 1/266* (2013.01); *G06F 1/305* (2013.01); *G06F 1/3203* (2013.01); *G06F 1/3206* (2013.01); *G06F 1/3287* (2013.01); *G06F 9/3851* (2013.01); *G06F 9/4812* (2013.01); *G06F 13/24* (2013.01)

(58) Field of Classification Search
CPC ...... G06F 1/266; G06F 9/4812; G06F 1/3206; G06F 1/3203; G06F 9/3851; G06F 13/24; G06F 1/305; G06F 1/3287
See application file for complete search history.

(56) References Cited

U.S. PATENT DOCUMENTS

| | | | |
|---|---|---|---|
| 8,677,165 | B2 | 3/2014 | Atkinson |
| 8,700,936 | B2 | 4/2014 | Mearns |
| 9,164,764 | B2 | 10/2015 | Schuchman et al. |
| 9,190,989 | B1 | 11/2015 | Sharda et al. |
| 9,372,526 | B2 | 6/2016 | Bodas et al. |
| 2011/0167067 | A1* | 7/2011 | Muppirala ............ G06F 3/0659 707/740 |

(Continued)

OTHER PUBLICATIONS

International Search Report and Written Opinion—PCT/US2018/024323—ISA/EPO—dated Jun. 12, 2018.

*Primary Examiner* — Xuxing Chen
(74) *Attorney, Agent, or Firm* — Loza & Loza, LLP/Qualcomm

(57) ABSTRACT

Aspects of the disclosure are directed to DC power management. A sequencer may be configured to execute a first command, wherein the first command is associated with a unique group tag; compare the unique group tag to a master group tag; determine if an interrupt is detected; lock the master group tag to yield a locked master group tag; execute a second command, wherein the second command is associated with the locked master group tag; determine that an end of commands in the locked master group tag is reached and execute a sequence jump through command to put a processor back to a regular power state.

30 Claims, 12 Drawing Sheets

(56) References Cited

U.S. PATENT DOCUMENTS

2012/0327447 A1* 12/2012 Funakawa .............. G06F 3/044
  358/1.13
2014/0032947 A1 1/2014 Ahmad et al.

* cited by examiner

| DC POWER STATE | WAKEUP TIME | TARGET RESIDENCY | POWER CONSUMPTION |
|---|---|---|---|
| C0 | 0 | NA | 1 |
| C1 | 1ns | 100ns | 0.6 |
| C2 | 1us | 10us | 0.2 |
| C3 | 10us | 100us | 0.1 |
| C4 | 20us | >500us | 0.02 |

ENTRY SEQUENCE COMMAND ACTION LIST 710

| CMD Opcode | ENTRY SEQUENCE COMMAND ACTION (Opcode Description) | GROUP TAG |
|---|---|---|
| 0x50 | REQUEST TOKEN FROM INRUSH MANAGER | 1 |
| 0x2B | TOKEN GRANT FROM INRUSH MANAGER | 1 |
| 0x30 | TURN ON RESET. | 2 |
| 0x40 | CLAMP CPU INPUT/OUTPUTS | 3 |
| 0x00 | GATE CPU CLOCK | 4 |
| 0xC0 | DISABLE RAMs CHIP SELECT | 5 |
| 0x14 | TRIGGER RAMs INTO SLEEP WITH RETENTION MODE | 6 |
| 0x3B | WAIT FOR RAM SLEEP SEQUENCER IDLE | 6 |
| 0x24 | TRIGGER RAMs INTO SLEEP WITHOUT RETENTION MODE | 6 |
| 0x3B | WAIT FOR RAM SLEEP SEQUENCER IDLE | 6 |
| 0x80 | CLAMP RAM INPUT/OUTPUTS | 7 |
| 0xE2 | TRIGGER OPENING FEW OF THE HEAD SWITCHES | 8 |
| 0x92 | TRIGGER OPENING REST OF THE HEAD SWITCHES | 8 |
| 0x1B | WAIT TILL ALL HEAD SWITCHES ARE OPENED | 8 |
| 0x50 | RELEASE TOKEN FROM INRUSH MANAGER | 1 |
| 0x03 | SLEEP. WAIT FOR WAKE UP EVENT. | 9 |

EXIT SEQUENCE COMMAND ACTION LIST 720

| CMD Opcode | EXIT SEQUENCE COMMAND ACTION (Opcode Description) | GROUP TAG |
|---|---|---|
| 0x50 | REQUEST TOKEN FROM INRUSH MANAGER | 1 |
| 0x2B | TOKEN GRANT FROM INRUSH MANAGER | 1 |
| 0x92 | TRIGGER CLOSING FEW OF THE HEAD SWITCHES | 8 |
| 0xE2 | TRIGGER CLOSING REST OF THE HEAD SWITCHES | 8 |
| 0x1B | WAIT TILL ALL HEAD SWITCHES ARE CLOSED | 8 |
| 0x80 | UN-CLAMP RAM INPUT/OUTPUTS | 7 |
| 0x24 | TRIGGER RAMs FOR WAKEUP FROM SLEEP WITHOUT RETENTION MODE | 6 |
| 0x3B | WAIT FOR RAMs SLEEP SEQUENCER IDLE | 6 |
| 0x14 | TRIGGER RAMs FOR WAKEUP FROM SLEEP WITH RETENTION MODE | 6 |
| 0x3B | WAIT FOR RAM SLEEP SEQUENCER IDLE | 6 |
| 0xC0 | ENABLE RAMs CHIP SELECT | 5 |
| 0x04 | UN-GATE CPU CLOCK | 4 |
| 0x46 | UN-CLAMP CPU INPUT/OUTPUTS | 3 |
| 0x30 | TURN OFF RESET | 2 |
| 0x50 | RELEASE TOKEN FROM INRUSH MANAGER | 1 |
| 0x0F | END OF PROGRAM. | 0 |

US 10,338,655 B2

ADVANCED FALL THROUGH MECHANISM FOR LOW POWER SEQUENCERS

TECHNICAL FIELD

This disclosure relates generally to the field of power management, and, in particular, to power management logic, for example, relating to a fall through mechanism for power sequencers.

BACKGROUND

Processor systems, e.g., multi-processor systems, maintain different power states for the purpose of optimizing DC power savings. Processor systems may incorporate a DC power management system which activates most or all of the total number of processors when computational demands are high, i.e., a regular power state. Also, the DC power management system may idle (i.e., deactivate) a subset of the total number of processors when computational demands are low to minimize energy consumption, i.e., an idle power state. However, conventional DC power management systems tend to have large latencies if there is a need to wake up the processor systems while it is in the midst of entering a deep low power state. Hence, conventional DC power management systems incorporate DC power consumption inefficiencies and increase latency when a need for a DC power state change arises.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method for DC power management, the method including executing a first command, wherein the first command is associated with a unique group tag; comparing the unique group tag to a master group tag; determining if an interrupt is detected; locking the master group tag to yield a locked master group tag; executing a second command, wherein the second command is associated with the locked master group tag; determining that an end of commands in the locked master group tag is reached and executing a sequence jump through command to put a processor back to a regular power state. In one example, the method further include one or more of the following: organizing a plurality of commands into a sequentially ordered plurality of commands; grouping the sequentially ordered plurality of commands into a plurality of groups, wherein each command of the sequentially ordered plurality of commands is associated with a group of the plurality of groups; assigning the unique group tag to one group of the plurality of groups, wherein the first command is a command in the one group; determining that the processor is in the regular power state; measuring a time duration that the processor is in the regular power state; determining if the time duration is greater than a time duration threshold and/or executing a third command to transition the processor from the regular power state to an idle power state.

Another aspect of the disclosure provides an apparatus configured for DC power management, including at least one processor; a memory coupled to the at least one processor; a time counter coupled to the at least one processor, wherein the at least one processor is configured to: execute a first command, wherein the first command is associated with a unique group tag; compare the unique group tag to a master group tag; determine if an interrupt is detected; lock the master group tag to yield a locked master group tag; execute a second command, wherein the second command is associated with the locked master group tag; determine that an end of commands in the locked master group tag is reached and execute a sequence jump through command to put a central processing unit (CPU) back to a regular power state. In one aspect the at least one processor is further configured to perform one or more of the following: organize a plurality of commands into a sequentially ordered plurality of commands; group the sequentially ordered plurality of commands into a plurality of groups, wherein each command of the sequentially ordered plurality of commands is associated with a group of the plurality of groups; assign the unique group tag to one group of the plurality of groups, wherein the first command is a command in the one group; determine that the CPU is in the regular power state; measure a time duration that the CPU is in the regular power state; determine if the time duration is greater than a time duration threshold; and/or execute a third command to transition the CPU from the regular power state to an idle power state with less power consumption (i.e., lower power consumption) than the regular power state, if the time duration is greater than the time duration threshold.

Another aspect of the disclosure provides an apparatus configured for DC power management, including at least one time counter; at least one sequencer coupled to the time counter; means for executing a first command, wherein the first command is associated with a unique group tag; means for comparing the unique group tag to a master group tag; means for determining if an interrupt is detected; means for locking the master group tag to yield a locked master group tag; means for executing the second command, wherein the second command is associated with the locked master group tag; means for determining that an end of commands in the locked master group tag is reached and means for executing a sequence jump through command to put a processor back to a regular power state. In one aspect, the apparatus further includes one or more of the following: means for organizing a plurality of commands into a sequentially ordered plurality of commands; means for grouping the sequentially ordered plurality of commands into a plurality of groups, wherein each command of the sequentially ordered plurality of commands is associated with a group of the plurality of groups; means for assigning the unique group tag to one group of the plurality of groups, wherein the first command is a command in the one group; means for determining that the processor is in the regular power state; means for measuring a time duration that the processor is in the regular power state; means for determining if the time duration is greater than a time duration threshold; and/or means for executing a third command to transition the processor from the regular power state to an idle power state.

Another aspect of the disclosure provides a computer-readable medium storing computer executable code, operable on a device including at least one processor, and at least one memory coupled to the at least one processor, and the at least one processor configured to manage DC power, the computer executable code including instructions for causing a computer to execute a first command, wherein the first command is associated with a unique group tag; instructions for causing the computer to compare the unique group tag to a master group tag; instructions for causing the computer to determine if an interrupt is detected; instructions for causing the computer to lock the master group tag to yield a locked master group tag; instructions for causing the computer to execute a second command, wherein the second command is associated with the locked master group tag; instructions for causing the computer to determine that an end of commands in the locked master group tag is reached and instructions for causing the computer to execute a sequence jump through command to put a processor back to a regular power state. In one aspect, the computer executable code further includes one or more of the following: instructions for causing the computer to organize a plurality of commands into a sequentially ordered plurality of commands; instructions for causing the computer to group the sequentially ordered plurality of commands into a plurality of groups, wherein each command of the sequentially ordered plurality of commands is associated with a group of the plurality of groups; instructions for causing the computer to assign the unique group tag to one group of the plurality of groups, wherein the first command is a command in the one group; instructions for causing the computer to determine that the processor is in the regular power state; instructions for causing the computer to measure a time duration that the processor is in the regular power state; instructions for causing the computer to determine if the time duration is greater than a time duration threshold; and/or instructions for causing the computer to execute a third command to transition the processor from the regular power state to an idle power state.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it is understood that such exemplary embodiments can be implemented in various devices, systems, and methods.

BRIEF DESCRIPTION OF THE DRAWINGS

FIG. 4 illustrates an example low power state information table for different DC power states.

FIG. 7 illustrates an example command sequence with group tags.

DETAILED DESCRIPTION

Figure 1:
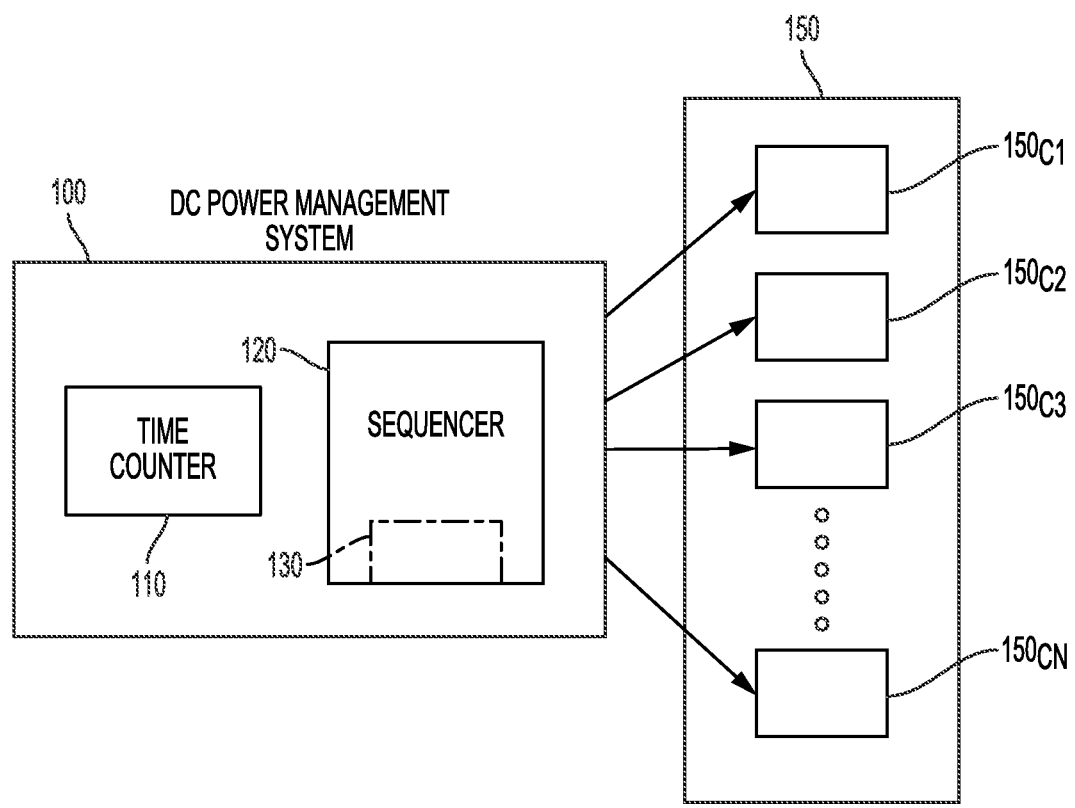
FIG. 1 illustrates an example block diagram of a DC power management system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to systems and methods for power management. In particular aspects, processor systems, e.g., multi-processor systems, may maintain different power states for the purpose of optimizing DC power savings. For example, processor systems may incorporate a DC power management system which idles (i.e., deactivates) a subset of the total number of processors when computational demands are low to minimize energy consumption, i.e., an idle power state. In one example, an idle power state may include a deep low power state or a shallow low power state. For a particular processor system, the shallow low power state is defined as having a greater power consumption than the deep low power state. Stated another way, when a processor system is in a deep low power state, it will consume less power than when the processor system is in a shallow low power state. That is, the deep low power state consumes less power (has lower power consumption) than the shallow low power state. For example, the computational demand may be quantified by a number of operations per second or the number of instructions per second. The DC power management system may aim to balance battery life (i.e., minimizing energy consumption) with processor performance.

The DC power management system may incorporate a number of sequential logic stage to enter a deep low power state, one example of an idle power state. In one example, a deep low power state may increase latency. Once a sequence for entering a deep low power state is initiated, the sequence may continue until the deep low power state is reached unless an interrupt occurs. An interrupt is an unscheduled request for the processor system to revert back to the regular power state. When an interrupt occurs asynchronously within the sequence for entering a deep low power state, the DC power management system may revert back by aborting the sequence to enter the deep low power state and start a process to restore the processor system to its regular power state. In one example, the DC power management system may mask (i.e., ignore) the interrupt until the deep low power state is achieved, for example, if the sequence of entering the deep low power state is at its last stage.

If the entering into the deep low power state is not at its last stage, continuing the sequential progression towards the deep low power state before restoration of the regular power state will increase inefficiencies and latency. Latency is defined as time delay in reaching back up to the regular power state. Moreover, the DC power management system may attempt to improve latency by putting the processor system in a shallow low power state. A shallow low power state has a better DC power consumption efficiency than a regular power state since the shallow low power state consumes less DC power than the regular power state. That is, the shallow low power state consumes less power (has lower power consumption) than the regular power state. However, the shallow lower power state does consume more DC power than the deep low power state. If the DC power management system directs the processor system to enter a shallow low power state to decrease latency for faster restoration to the regular power state, DC power consumption may be unnecessarily increased. Thus, putting the processor system only in the shallow lower power state may not always be an ideal power consumption solution.

FIG. 1 illustrates an example block diagram of a DC power management system 100. As shown in FIG. 1, the DC power management system 100 includes a time counter 110 and a sequencer 120. A multi-cluster 150 of processor systems (e.g., CPUs) $150_{c1}, 150_{c2}, 150_{c3} \ldots 150_{cn}$ are shown connected to the DC power management system 100. The DC power management system 100 may manage the power consumption of one or more of the processor systems $150_{c1}, 150_{c2}, 150_{c3} \ldots 150_{cn}$.

In one example, the time counter 110 is used to help determine when to transition from one power state to another power state; that is, a power state transition, (for example, from a regular power state to a deep lower power state). In one example, the sequencer 120 executes the commands needed to transition from one power state to another power state.

In one aspect, the improved DC power management system sequencer implements the power state transition upon the expiration of a first time duration, T1. The first time duration T1 is measured by the time counter 110. The time counter 110 may be implemented by a clock. The clock, for example, may include an oscillator and a counter. In one example, the time counter 110 may be an oscillator and a counter. In one aspect, the time counter 110 may be set initially to a counter value corresponding the first time duration T1 and may decrement the counter value until it reaches zero. The counter value may be predetermined or it may be adjusted according to application, for example, by a user.

In one aspect, the sequencer 120 includes an interrupt handling procedure which includes groupings of commands. For example, the sequencer includes a sequencer logic for setting a pre-programmed time limit for power state transitioning. In one example, the sequencer logic is executed by a separate component from the processors in the processor system. In another example, the sequencer logic is executed by one of the processors in the processor system. Also, the sequencer 120 may be an external component from the processor system. Or, the sequencer 120 may be one of the processors of the processor system.

In one example, the sequencer 120 employs a fall through mechanism 130 to improve the wake up performance from an idle power state. In one example, the fall through mechanism 130 includes a sequence of commands to reduce latency in transitioning power states. Wake up performance may be measured by the amount of time required from transitioning from an idle power state to a regular power state. For example, commands for transitioning from one power state to another power state (e.g. from a regular power state to an idle power state which may be a deep low power state) may be grouped into two or more groups. The sequence of commands in each group (i.e., command group), for example, may be associated together with a tag. Each command group includes one or more commands. The command groups may be put in a sequential order and may be executed in the sequential order. In one example, the sequential order of command groups may be predetermined. In another example, the sequential order of the command groups may be adjusted in accordance with a particular application, a particular power status of the processor system or by user determination.

In one example, as each command group is executed, a check of an interrupt is performed. If an interrupt is detected, the sequencer 120 continues to execute the commands within the particular command group which was being executed when the interrupt occurred (i.e., an interrupted command group). Once all the commands within that interrupted command group are executed, the sequencer 120 may execute a sequence jump through command to put the processor system back into the regular power state. The sequence jump though command is a command to execute one or more commands associated with transitioning the processor system from a power state at a time when the interrupt is detected back to a regular power state. By executing the sequence jump through command, when an interrupt is detected and after the commands in the interrupted command group have been executed, the processor system is reverted to a trajectory of returning to its regular power state. Hence, latency is minimized by the sequence jump through command since completing the transition to an idle power state (e.g., the deep low power state) is avoided once an interrupt is detected, and the processor system is restored to its regular power state without having to first reach an idle power state (e.g., deep low power state).

In one aspect, the DC power management system 100 tracks entry sequence commands executed at the time of wakeup or at the time of being at the regular power state prior to power transition. The DC power management system 100 also selectively triggers a minimal number of restore sequence commands to restore the processor system to the regular power state executing commands in the command groups. Entry sequence commands are the set of commands that have been executed between the time the processor system was in either an inactive state (i.e., prior to wakeup) or a regular power state until the interrupt was detected. Restore sequence commands are the set of commands needed to be executed to restore the processor system from whatever state it is at back to the regular power state. In one example, the sequencer 120 (which is part of the DC power management system 100) is the component that tracks the entry sequence commands and triggers the restore sequence commands.

In one aspect, once an interrupt is detected, the DC power management system 100 (such as the sequencer 120) may direct the processor system to revert back to the regular power state. Upon return to the regular power state, the time counter 110 may be activated. In one example, the timing activation may be implemented by the setting of a time limit in the timer counter's state element, for example a register or a memory location. Upon expiration of the first time duration, T1, and if there are no additional conditions that dictate staying at the regular power state, the DC power management system 100 (such as the sequencer 120) may proceed with transitioning the processor system from the regular power state back to an idle power state (e.g., a shallow low power state or a deep low power state).

In another aspect, during a transition from the regular power state to the deep low power state, the DC power management system 100 (such as the sequencer 120) may stay idle at the shallow low power state for a second time duration, T2. The second time duration T2 may be measured by the time counter 110. Upon expiration of the second time duration, T2, and if there are no additional conditions that dictates the processor system to stay at the shallow low power state or return to the regular power state, the DC power management system 100 (such as the sequencer 120) may then continue with the transition to the deep low power state. The timing feature having a first time duration and/or a second time duration to help implement transitions between power states may improve DC power management efficiency and may reduce latency.

In one example, the time durations of the time counter 110 may be based according to the quantity of logic fall throughs. In one example, logic fall throughs are events where an interrupt occurs while a sequence is being executed and some of the sequence steps need to be aborted or bypassed to restore the regular power state as soon as possible. For example, the quantity of logic fall throughs may be related to a number of command groups in a sequence of commands. In one example, the first time duration T1 and/or the second time duration T2 may be proportional to the number of command groups in the sequence of commands. In another example, the first time duration T1 and/or the second time duration T2 may be monotonically related to the number of command groups in the sequence of commands.

Figure 2:
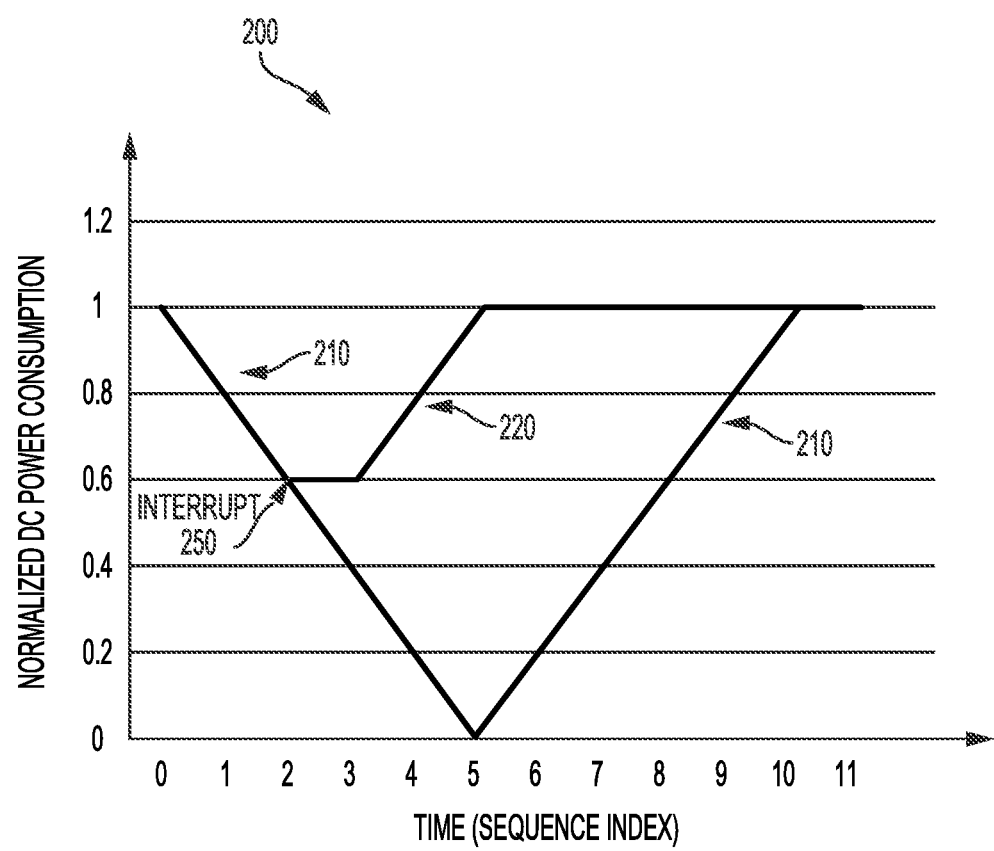
FIG. 2 illustrates a comparison of a conventional power profile and a first example power profile of a processor system that uses a DC power management system of the present disclosure.

FIG. 2 illustrates a comparison 200 of a conventional power profile 210 and a first example power profile 220 of a processor system that uses a DC power management system of the present disclosure. In FIG. 2, normalized DC power consumption is shown on the vertical axis and time is shown on the horizontal axis. In the example of FIG. 2, the normalized DC power consumption has a numerical value of unity ("1") when the processor system is in a regular power state. In FIG. 2, the normalized DC power consumption is expressed in a normalized unit of DC power relative to the DC power in the regular power state. Time is expressed as a sequence index, where each command sequence may have a unique sequence index which increases monotonically with time. As shown in FIG. 2, conventional systems continue their transition from their regular power state (where their normalized DC power consumption is at 1) towards the deep low power state (where their normalized DC power consumption is at 0) even if an interrupt 250 is detected. In the power profile 220 of a processor system that uses a DC power management system of the present disclosure, once the interrupt 250 is detected, steps are taken to revert back to the regular power state. As shown in the power profile 220, once the interrupt 250 is detected, there is a short time duration where the power profile 220 is flat at 0.6 normalized DC power consumption (in this example) and then there's an incline in the power profile 220 until it reaches the value 1 which is the regular power state. In one example, the short time duration where the power profile 220 is flat at 0.6 normalized DC power consumption may indicate the time duration when the rest of the commands in the interrupted command group are executed. And, the incline in the power profile 220 until it reaches back to the value 1 at the $5^{th}$ sequence index may indicate the time duration when the restore sequence commands are being executed to restore the processor system back to the regular power state.

Figure 3:
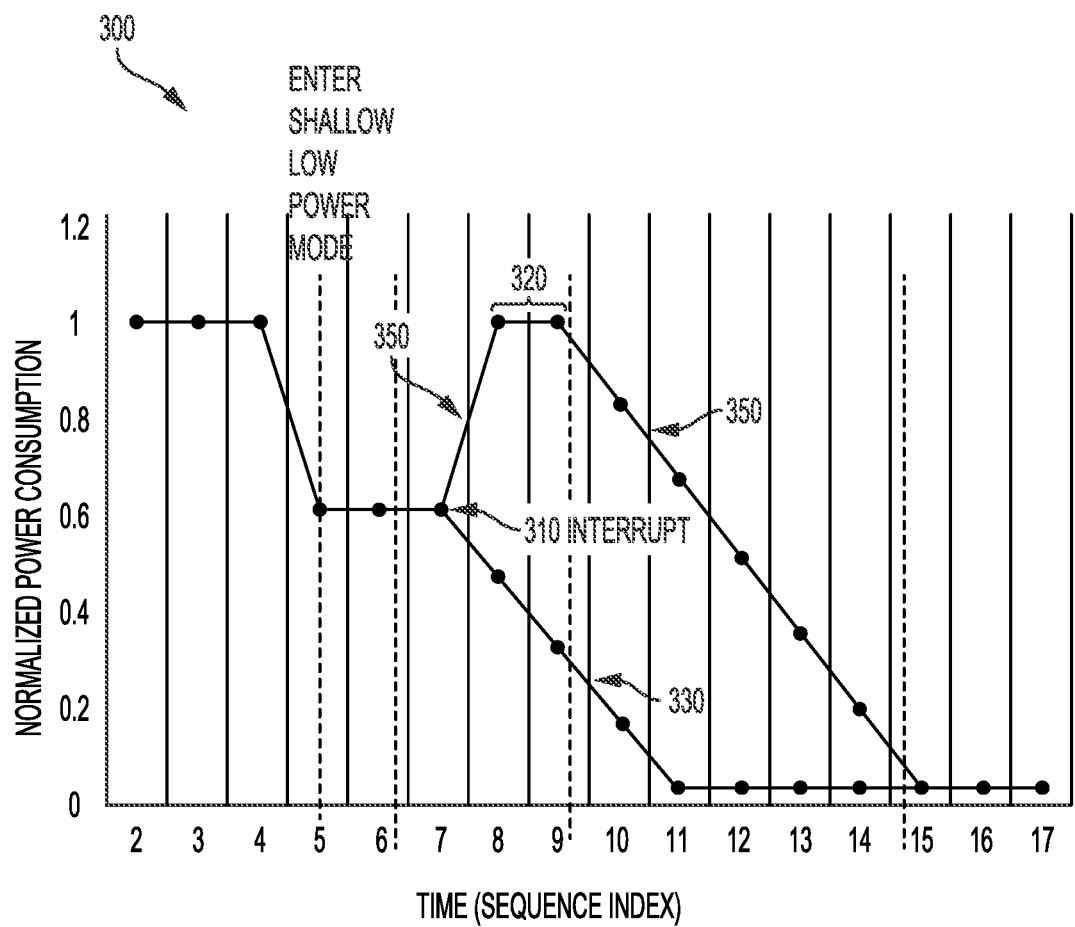
FIG. 3 illustrates a second example power profile of a processor system that uses a DC power management system of the present disclosure.

FIG. 3 illustrates a second example power profile 300 of a processor system that uses a DC power management system of the present disclosure. In FIG. 3, the power profile 300 shown is normalized. Normalized DC power consumption is shown on the vertical axis and time is shown on the horizontal axis. In FIG. 3, the power profile 300 includes two branches: interrupt power profile 350 and no interrupt power profile 330. The interrupt power profile 350 shows the normalized power consumption versus time for low power switching when an interrupt 310 is detected (i.e., an interrupt scenario). The no interrupt power profile 330 shows the normalized power consumption versus time for low power switching when no interrupt 310 is detected (i.e., a no interrupt scenario).

As shown in the power profile 300, the processor system is first put in a shallow low power state at the $5^{th}$ sequence index before proceeding to a deep low power state if there is no interrupt. In FIG. 3, the normalized DC power consumption has a numerical value of unity when in a regular power state. In this example, normalized DC power consumption is expressed in a normalized unit of DC power relative to the DC power in the regular power state. Time is expressed as a sequence index, where each command sequence may have a unique sequence index which increases monotonically with time. In this example, both the interrupt power profile 350 and the no interrupt power profile 330 starts in a regular power state with a normalized DC power consumption of unity ("1"). Then, in the $4^{th}$ sequence index, the power profiles (interrupt power profile 350 and no interrupt power profile 330) transition to a shallow low power state with a normalized DC power consumption of 0.6, in this example. In the $7^{th}$ sequence index, the two power profiles (interrupt power profile 350 and no interrupt power profile 330) diverge.

For the interrupt power profile 350 where an interrupt 310 is detected at the $7^{th}$ sequence index (i.e., interrupt scenario), the interrupt power profile 350 reverts back to the regular power state with a normalized DC power consumption of unity ("1") until a time duration expires. The time duration may be measured by the time counter 110. In one example, the time duration 320 may be programmed or predetermined. At the expiration of the time duration, the interrupt power profile 350 then transitions to a deep low power state, whereby FIG. 3 shows that in the example, the deep low power state is reached by the $15^{th}$ sequence index. Beyond the $15^{th}$ sequence index, FIG. 3 shows that the processor system is in the deep low power state.

For the no interrupt power profile 330 where no interrupt is detected (i.e., no interrupt scenario), the no interrupt power profile 330 continues at the $7^{th}$ sequence index its transition to the deep low power state which is reached by the $11^{th}$ sequence index. Beyond the $11^{th}$ sequence index, FIG. 3 shows that the processor system is in the deep low power state.

FIG. 4 illustrates an example low power state information table 400 for different DC power states. Shown in FIG. 4 are five DC power states, namely C0 which is the regular power state, and C1 through C4 which are idle power states ranging from shallow low power state to deep low power state. In the example of FIG. 4, C1 is the shallowest low power state and C4 is the deepest low power state. The example low power state information table 400 illustrates the trend of increasing wakeup time, increasing target residency, and decreasing DC power consumption as the power states transition from C0 to C4, sequentially. In the example of FIG. 4, target residency is the target time duration for the DC power state. One skilled in the art would know that the five different power consumptions are not exclusive and that a processor system may operate at other difference DC power states not shown in FIG. 4 and still be within the scope and spirit of the present disclosure.

Figure 5:
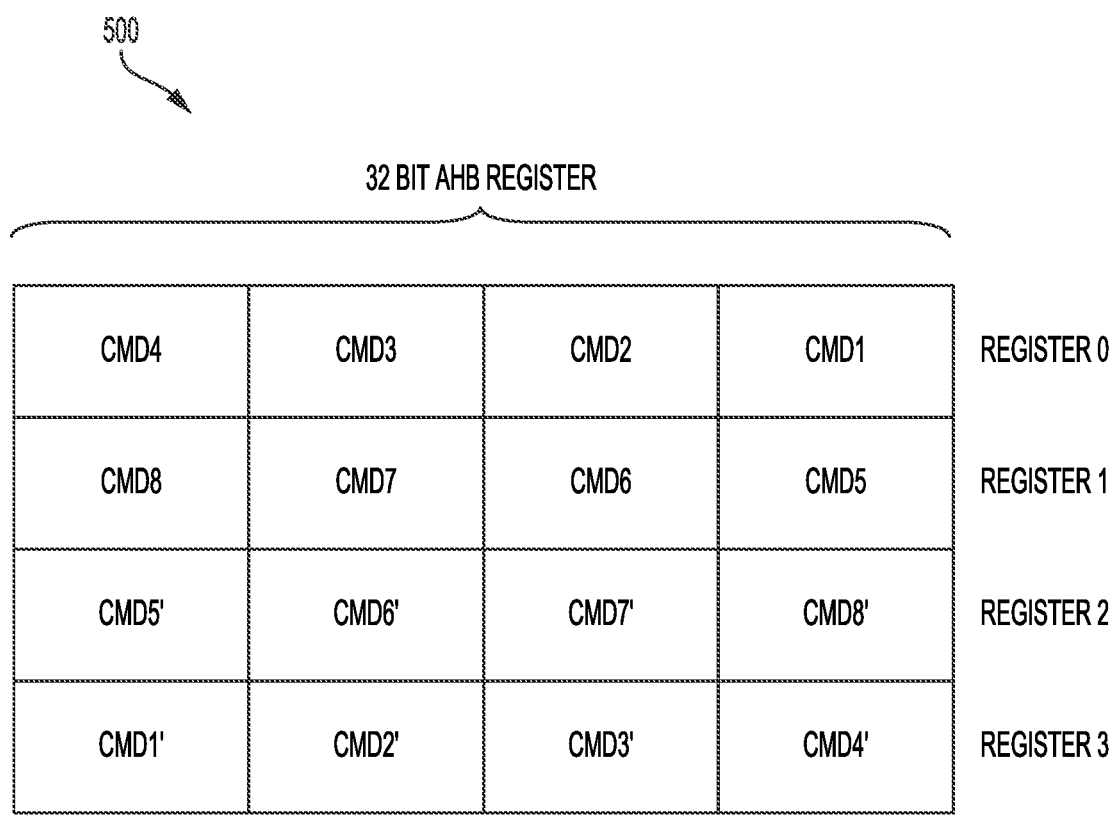
FIG. 5 illustrates an example command arrangement.

FIG. 5 illustrates an example command arrangement 500. In FIG. 5, the command arrangement 500 shows a sequence of commands organized in a sequential order within a processor register. In the example of FIG. 5, the processor register is a 32 bit AHB (AMBA high performance bus) register. AMBA stands for ARM Advanced Microcontroller Bus Architecture where the acronym "ARM" is a tradename. One skilled in the art would understand that although many skilled artisans in the field may use an AMBA high performance bus register (i.e., AHB register), that the present disclosure does not preclude other types of register. Thus, the use of other types of registers are also within the scope and spirit of the present disclosure. In one example, the sequence of commands includes a set of complementary command pairs CMDx and CMDx', where CMDx is a power down command for component x and CMDx' is the complementary power up command for component x. In the example, the power up sequence is the inverse of the power up sequence.

Figure 6:
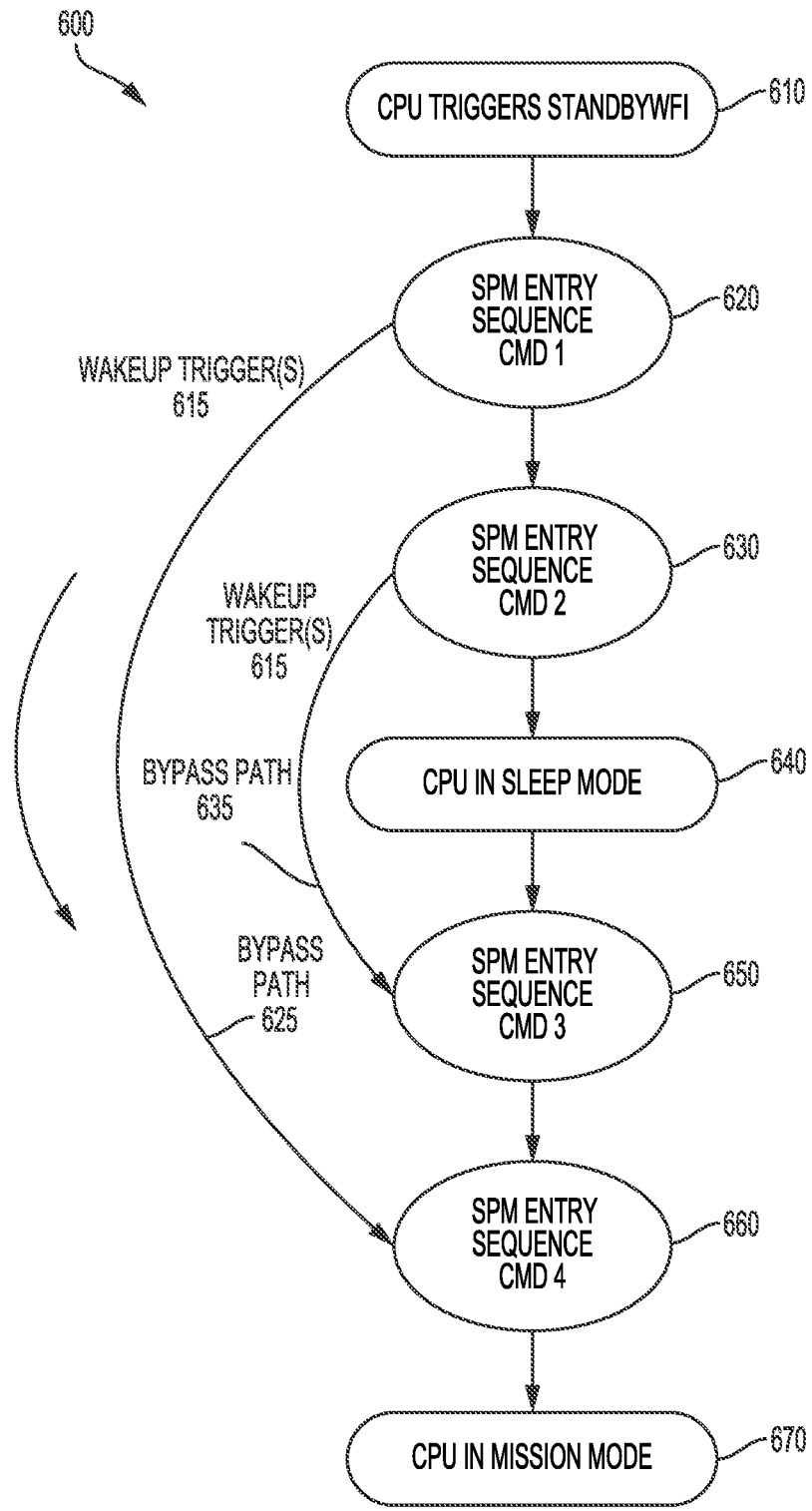
FIG. 6 illustrates an example execution flow in accordance with the example command arrangement of FIG. 5.

FIG. 6 illustrates an example execution flow 600 in accordance with the example command arrangement 500 of FIG. 5. The execution flow 600 starts with a trigger event. In block 610, the processor system (e.g., CPU) triggers a command "standbywfi" to enter the processor system into an idle power state (a.k.a. standby power state). In block 620, a DC power management system executes a first entry sequence command (cmd1) to enter the processor system (e.g., CPU) towards a sleep mode. In one example, the sleep mode may be a shallow low power state. In one example, the sleep mode may be a deep low power state. Following block 620, in block 630, the DC power management system executes a second entry sequence command (cmd2) to enter the processor system (e.g., CPU) into the sleep mode (e.g., the shallow low power state). In block 640, the processor system (e.g., CPU) is in the sleep mode (e.g., a shallow low power state or a deep low power state).

In block 620, determine if one or more wakeup trigger(s) 615 is detected. In one example, an interrupt is a wakeup trigger. If in block 620, one or more wakeup triggers 615 is detected, proceed through a first bypass path 625 to block 660, instead of proceeding to block 630. Similar, in block 630, determine if one or more wakeup trigger(s) 615 is detected. If in block 630, one or more wakeup triggers 615 is detected, proceed through a second bypass path 635 to block 650, instead of proceeding to block 640.

In block 650, the DC power management system executes a third entry sequence command (cmd3) to enter the processor system (e.g., CPU) towards a mission mode. In one example, the mission mode is a regular power state. In block 660, the DC power management system executes a fourth entry sequence command (cmd4) to enter the processor system (e.g., CPU) into the mission mode. In block 670, the processor system (e.g., CPU) is in the mission mode (e.g., regular power state).

FIG. 7 illustrates an example command sequence 700 with group tags. The command sequence 700 includes, for example, an entry sequence command action list 710 and an exit sequence command action list 720. The entry sequence command action list 710 includes a plurality of entry sequence commands with each entry sequence command presented as a row in the entry sequence command action list 710. As shown in FIG. 7, each entry sequence command includes three components: a command opcode, an entry sequence command action and a group tag. One skilled in the art would understand that the three components shown for the entry sequence commands are not exclusive or mandatory. That is, any of the three component shown need not be included and other components may be included and be within the scope and spirit of the present disclosure.

Similarly, the exit sequence command action list 720 includes a plurality of exit sequence commands with each exit sequence command presented as a row in the exit sequence command action list 720. As shown in FIG. 7, each exit sequence command includes three components: a command opcode, an exit sequence command action and a group tag. One skilled in the art would understand that the three components shown for the exit sequence commands are not exclusive or mandatory. That is, any of the three component shown need not be included and other components may be included and be within the scope and spirit of the present disclosure. In one aspect, an exit sequence command is a restore sequence command.

In one aspect, all command sequences are divided into groups such that if any of the commands from a group is executed for entry into an idle power state, then all the commands in that group must be executed for proper functioning of processor hardware. For example, turning on reset and turning off reset are assigned the same group. That is, if reset is turned on for entry into the idle power state, then reset must be turned off for exit. As another example, if there is a first command to trigger opening of a head switch and a second command to wait for its acknowledgment, then both the first command and second command are executed together and hence be assigned the same group. Correspondingly, closing of a head switch and waiting for its acknowledgment are executed together and be assigned the same group. In addition, grouping of commands are done is such a way as to minimize the quantity of commands per group. In another aspect, command grouping are dynamically configurable by software. Also, each group is assigned a group tag. In one example, each group tag is unique.

In the example command sequence 700, each of the command opcodes may include two hexadecimal digits. In one example, the group tags identify a command group. In one example, when an interrupt is detected, all sequence command actions (e.g., entry sequence command actions) with the same group tag as the particular entry sequence command action currently being executed are allowed to execute before the interrupt is handled; that is, before other commands (e.g., restore sequence commands) are executed to restore the processor system back to the regular power state. In FIG. 7, the command group in the entry sequence command actions with group tag 6 are specifically identified. Similarly, the command group in the exit sequence command actions with group tag 6 are specifically identified.

Figure 8:
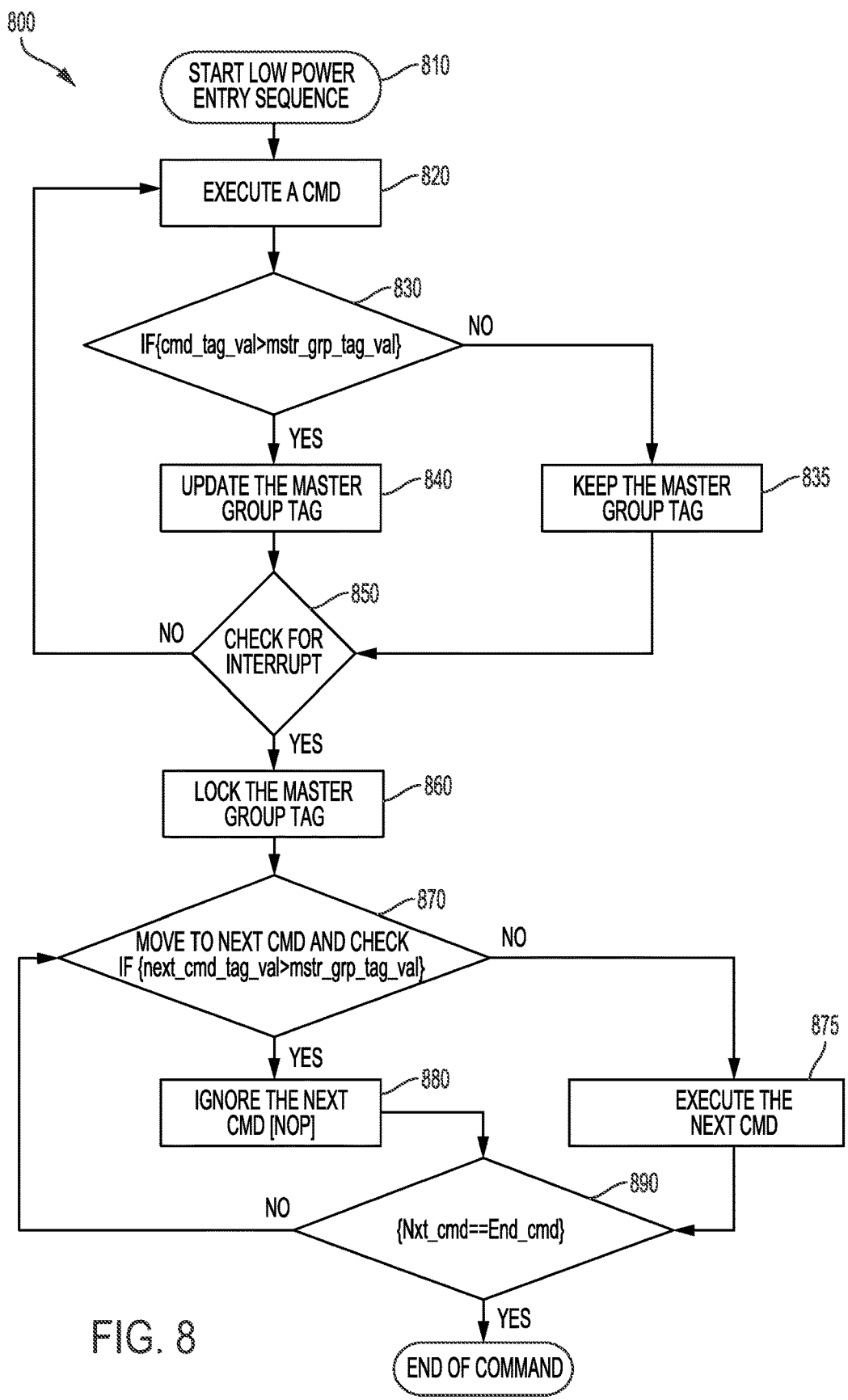
FIG. 8 illustrates an example fall through algorithm flow diagram.

FIG. 8 illustrates an example fall through algorithm flow diagram 800. In block 810, start a low power entry sequence. In one example, the low power entry sequence is executed to enter an idle power state. The idle power state may be a shallow low power state, a deep low power state or any idle power state that consumes less power than the regular power state. Degrees of different power consumption is, for example, shown in FIG. 4 with the different DC power states C0, C1, C2, C3, C4. One skilled in the art would know that the different power consumptions are not limited to just the five DC power states shown in FIG. 4.

In block 820, execute a command. In one example, the command is one of the command actions illustrated in FIG. 7. In block 830, determine if a group tag associated with the command being executed (a.k.a., command tag value) exceeds a master group tag (a.k.a. master group tag value). In one example, the master group tag is a reference tag value. In one aspect, the master group tag also represents the group for a current set of commands being executed. If no, proceed to block 835 to keep the master group tag. Following block 835, proceed to block 850. If yes, proceed to block 840 to update the master group tag. In one example, update means to increment the master group tag, for example, by a numerical value, such as "1". One skilled in the art would understand that the unit of increment may be a design choice or an application choice and may be either predetermined or adjusted by the user. Following block 840, proceed to block 850.

In block 850, check for an interrupt. If no interrupt is detected, return to block 820. If an interrupt is detected, proceed to block 860. In block 860, lock the master group tag. In one example, locking the master group tag means not to allow the master group tag to increment. In block 870, proceed to a next command and determine if a next command tag value exceeds the master group tag. If no, proceed to block 875. In block 875, execute the next command. Following block 875, proceed to block 890. If yes, proceed to block 880 and ignore the next command (i.e., perform a no-operation "NOP"). Following block 880, proceed to block 890. In block 890, determine if the next command is an end command. If no, proceed back to block 870. If yes, proceed to block 895. In block 895 end the low power entry sequence.

Figure 9:
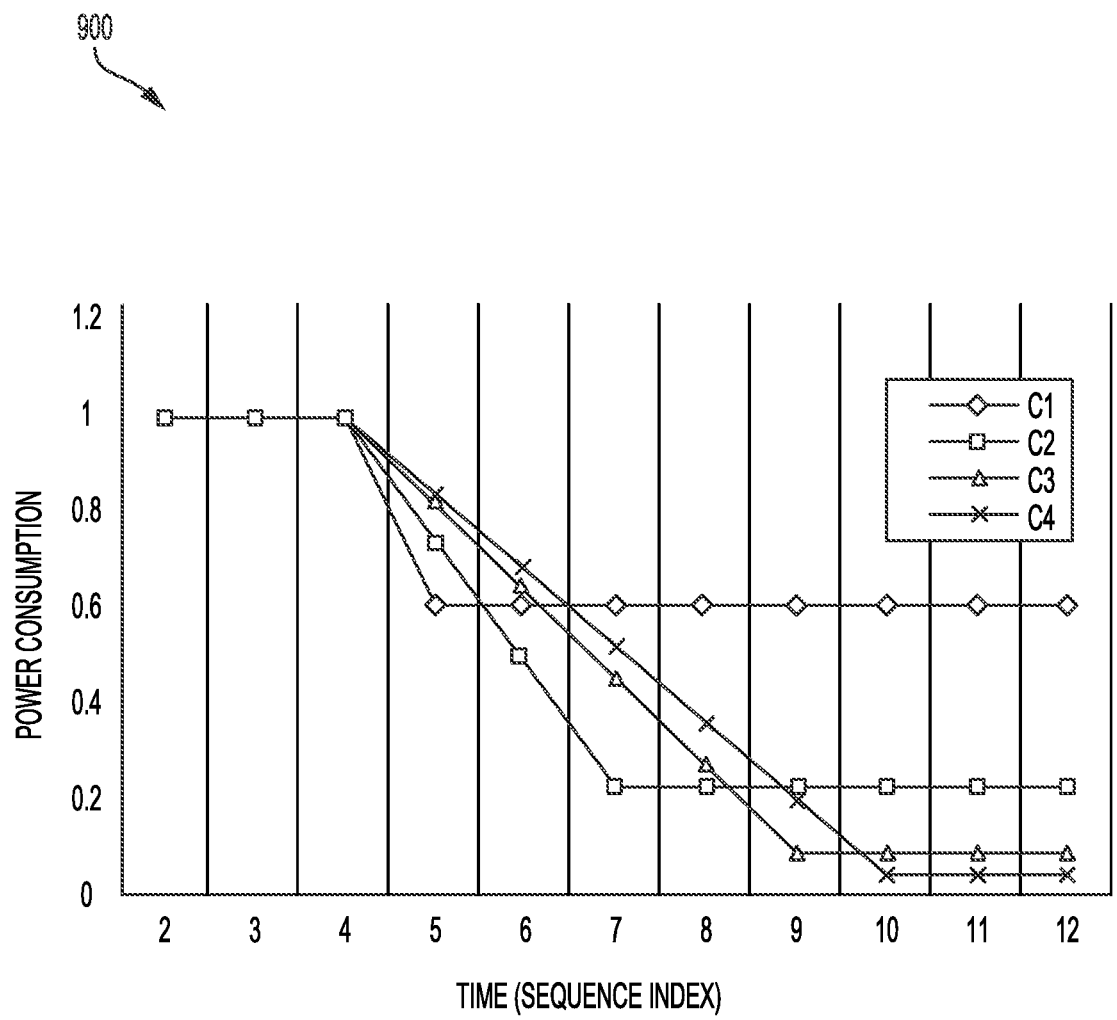
FIG. 9 illustrates an example chronology for low power entry for different DC power states.

FIG. 9 illustrates an example chronology 900 for low power entry for different DC power states. In the example chronology 900, normalized DC power consumption vs. time is shown for four idle power states: C1, C2, C3, C4, ordered from shallowest to deepest low power states. C0 is the regular power state. In FIG. 9, normalized DC power consumption is shown on the vertical axis and time is shown on the horizontal axis. Time is expressed as a sequence index, where each command sequence may have a unique sequence index which increases monotonically with time. In one example, the power states (idle power states: C1, C2, C3, C4, and the regular power state: C0) shown in FIG. 9 have the wakeup time, target residency and power consumption values of the same power states illustrated in FIG. 4.

Figure 10:
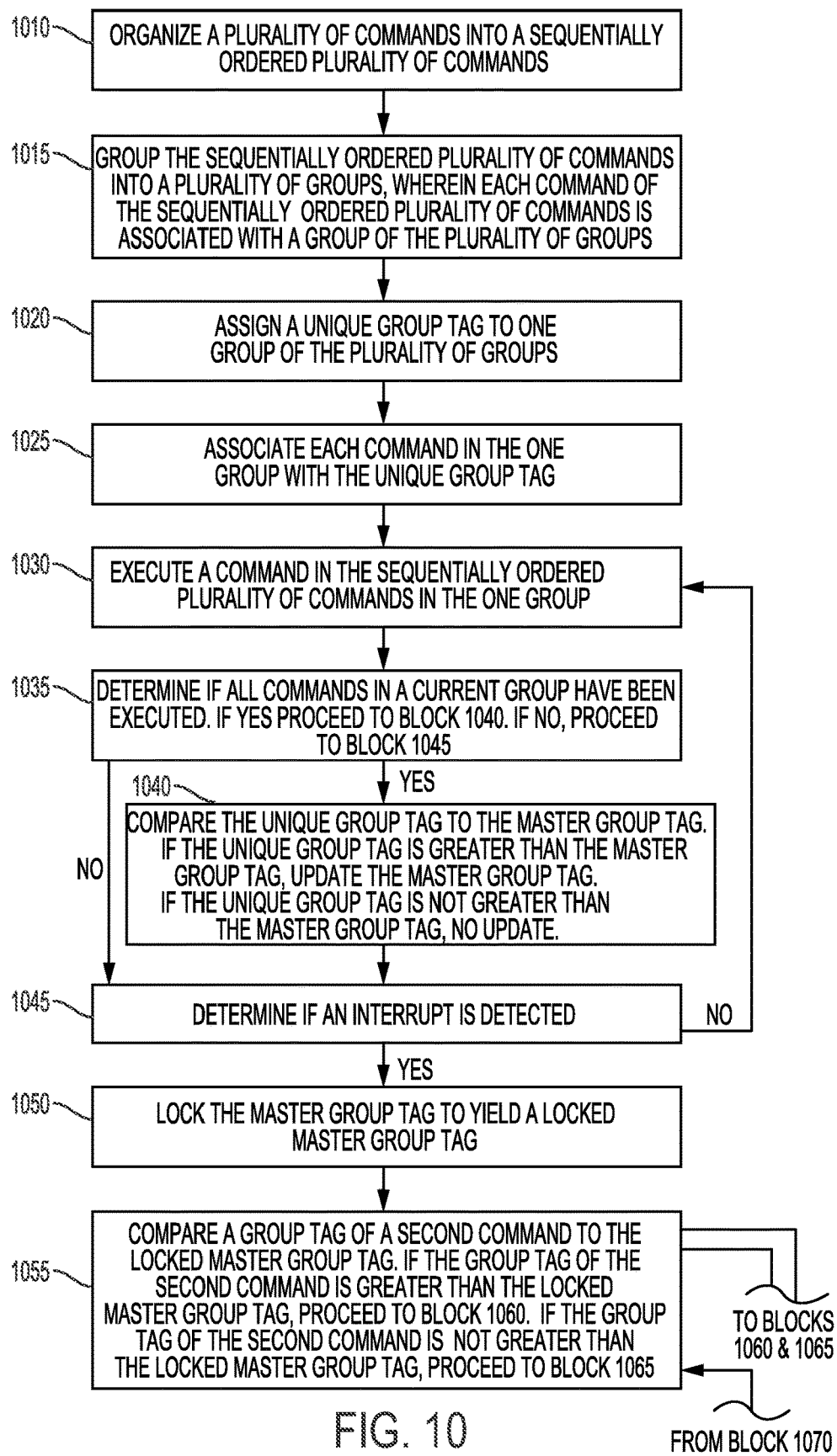
FIG. 10 illustrates a flow chart of an example method for performing DC power management according to various aspects of the present disclosure.
Figure 10:
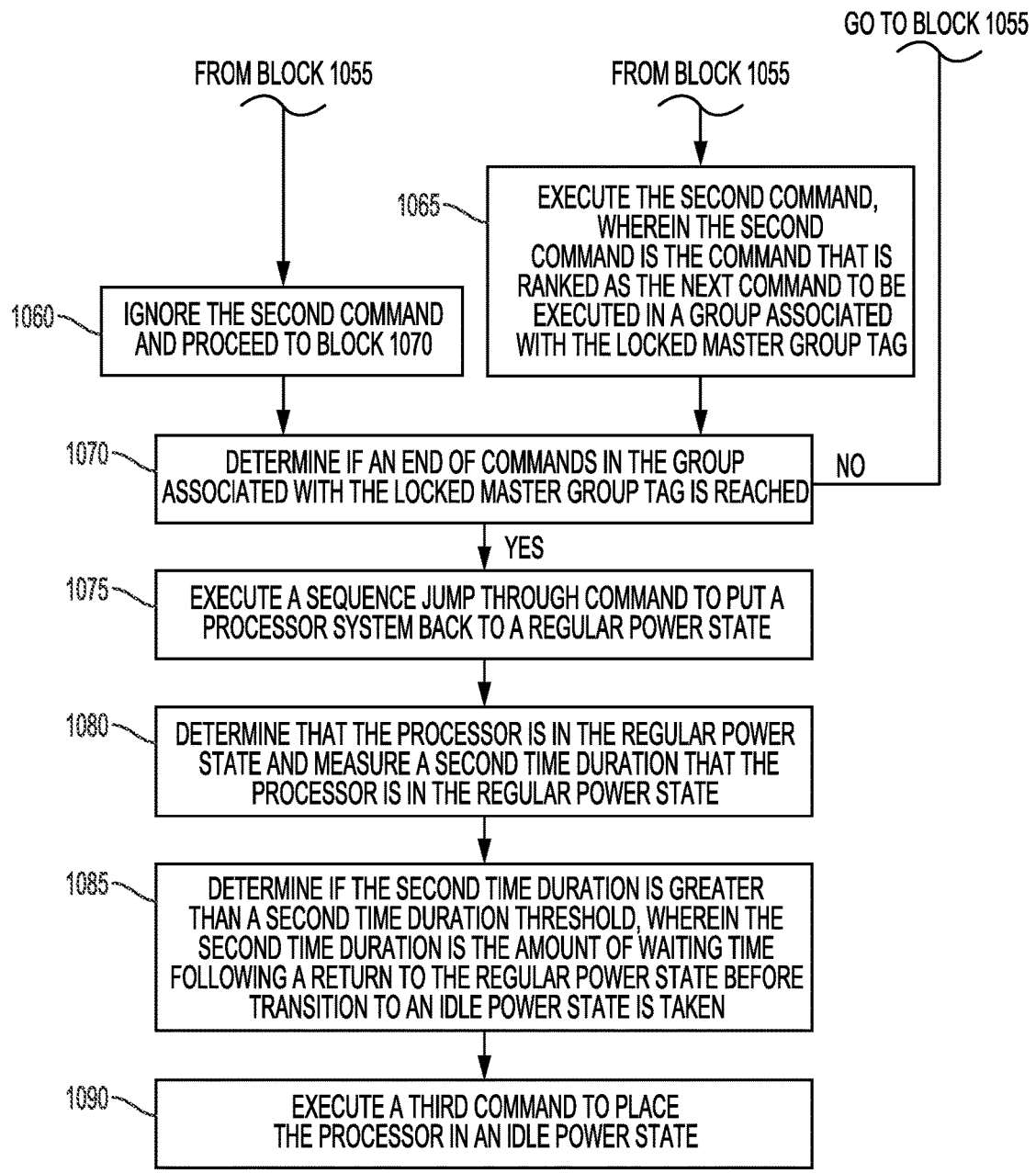

FIG. 10 illustrates a flow chart 1000 of an example method for performing DC power management according to various aspects of the present disclosure.

In block 1010, organize a plurality of commands into a sequentially ordered plurality of commands. In one example, the plurality of commands are organized in a sequential order for execution. The commands are entry sequence commands. The entry sequence commands may include commands to place a processor system to an idle power state. The idle power state, for example, may be a shallow low power state, or a deep low power state.

In block 1015, group the sequentially ordered plurality of commands into a plurality of groups, wherein each command of the sequentially ordered plurality of commands is associated with a group of the plurality of groups. That is, each of the sequentially ordered plurality of commands belongs to one group in the plurality of groups. And, the grouping preserves the sequential order of the plurality of commands.

In block 1020, assign a unique group tag to one group of the plurality of groups. That is, each group in the plurality of groups is associated with a group tag that is unique to that group.

In block 1025, associate each command in the one group with the unique group tag.

In block 1030, execute a command (e.g., a first command) in the sequentially ordered plurality of commands in the one group. The first command is the command that is ranked as the next command to be executed in a sequential order of the commands in the one group. In block 1035, determine if all commands in a current group have been executed. If yes, proceed to block 1040. If no, proceed to block 1045.

In block 1040, compare the unique group tag to the master group tag. If the unique group tag is greater than the master group tag, update the master group tag. In one example, updating the master group tag is incrementing the value of the master group tag by a predetermined number. If the unique group tag is not greater than the master group tag, no action is taken (i.e., no updating the master group tag). In an optional example, block 1040 includes determining if a first time duration is greater than a first time duration threshold. In one example, the first time duration is the amount of waiting time at a shallow low power state before continuing a transition to another idle power state (e.g., a deep low power state). The first time duration threshold may be predetermined or adjusted according to the application, or design or user choice. If the first time duration is not greater than the first time duration threshold, take no further action. If the first time duration is greater than the first time duration threshold, proceed to block 1045. In one example, the time counter 110 may be used to measure the first time duration. In one example, the time counter 110 may be used to determine if the first time duration is greater than the first time duration threshold.

In block 1045, determine if an interrupt is detected. If no, proceed back to block 1030. If yes, proceed to block 1050. In block 1050, lock the master group tag to yield a locked master group tag. In one example, locking the master group tag means not to allow the master group tag to update (i.e., not to increment in value).

In block 1055, compare a group tag of a second command to the locked master group tag. If the group tag of the second command is greater than the locked master group tag, proceed to block 1060 and the second command is not executed. If the group tag of the second command is not greater than the locked master group tag, proceed to block 1065.

In block 1060, ignore the second command and proceed to block 1070. By ignoring the second command, the second command is not executed. That is, a no-operation "NOP" is performed.

In block 1065, execute the second command. The second command is the command that is ranked as the next command to be executed in a group associated with the locked master group tag. In one example, the group associated with the locked master group tag is the current group mentioned in block 1035.

In block 1070, determine if an end of commands in the group associated with the locked master group tag is reached. If no, proceed back to block 1055. If yes, proceed to block 1075.

In block 1075, execute a sequence jump through command to put a processor system back to a regular power state. The sequence jump though command is a command to execute one or more commands associated with transitioning the processor system from a power state at a time when the interrupt is detected back to a regular power state.

In block 1080, determine that the processor is in the regular power state and measure a second time duration that the processor is in the regular power state. In one example, a time counter is used to measure the second time duration. In one example, the time counter 110 may be used to measure the second time duration.

In block 1085, determine if the second time duration is greater than a second time duration threshold. In one example, the second time duration is the amount of waiting time following a return to the regular power state before transition to an idle power state is taken. The second time duration threshold may be predetermined or adjusted according to the application, or design or user choice. If the second time duration is not greater than the second time duration threshold, proceed to block 1080. If the second time duration is greater than the second time duration threshold, proceed to block 1090. In one example, the time counter 110 may be used to determine if the second time duration is greater than the second time duration threshold.

In block 1090, execute a third command to place (i.e., transition) the processor in an idle power state. The idle power state may be a shallow low power state, a deep low power state or any idle power state that consumes less power than the regular power state. In one aspect, each of the steps in each of the blocks of FIG. 10 may be implemented by one of more of the following: a DC power management system (e.g., DC power management system 100 of FIG. 1); a sequencer (e.g., sequencer 120 of FIG. 1 or a sequencer 120 that employs a fall through mechanism 130 as shown in FIG. 1); a software algorithm (e.g. software 1150; a processor 1100; or a processor coupled to a memory (e.g. processor 1110 and memory 1120 of FIG. 11).

Figure 11:
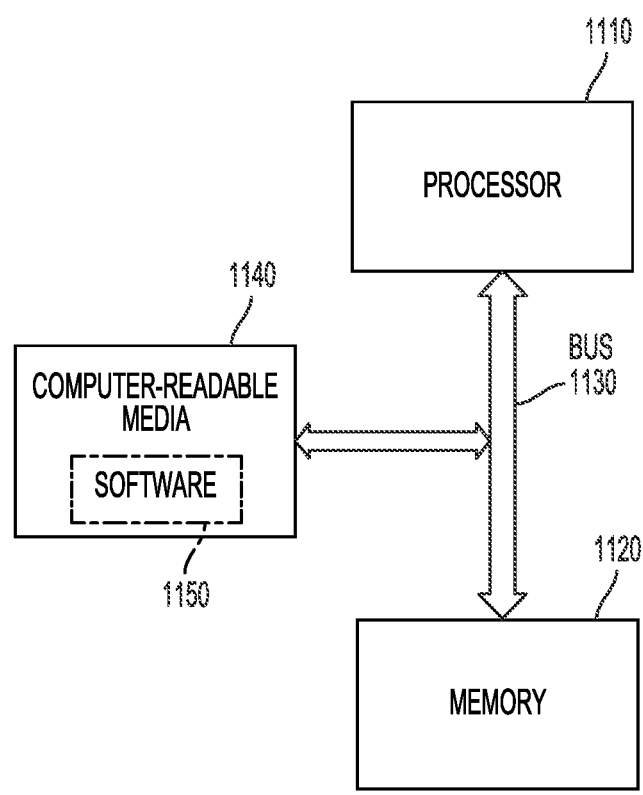
FIG. 11 is an example block diagram of an illustrative hardware configuration for an apparatus including a processor coupled to a memory for performing DC power management in accordance to various aspects of the present disclosure.

FIG. 11 is an example block diagram of an illustrative hardware configuration for an apparatus 1100 including a processor 1110 coupled to a memory 1120 for performing DC power management in accordance to various aspects of the present disclosure. In this example, the processor 1110 may be implemented with a bus architecture represented generally by bus 1130. The bus 1130 may include any number of interconnecting buses and bridges depending on the specific application of the apparatus 1100 and the overall design constraints. The bus 1130 may link other circuits (not shown), including computer-readable media 1140 to the processor 1110 and the memory 1120. Although computer-readable media is described herein, one skilled in the art would understand that a single computer-readable medium is also within the scope and spirit of the present disclosure. The bus 1140 may also link various other circuits such as timing sources, peripherals, and voltage regulators which are well known in the art, and therefore, will not be described any further.

In one example, the memory 1120 may be used to store data or information. For example, the memory 1120 may store commands and/or parameters (such as but not limited to command codes, group tag, etc.) related to the commands.

In one example, the processor 1110 may manage the bus 1130 and general processing, including the execution of software 1150 stored on computer-readable media 1140 and/or memory 1120. In one aspect, the processor 1110 may include more than one processors and may include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processor 1110 may execute software 1150. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable media 1140. The computer-readable media 1140 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. In one example, the computer-readable media 1140 may reside in the processor 1110. In another example, the computer-readable media 1140 may be external to the processor 1110 (as shown in FIG. 11). In yet another example, the computer-readable media 1140 may be distributed across multiple entities including the processor system 1110. The computer-readable media 1140 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In accordance with aspects of the present disclosure, the steps in FIGS. 6, 8 and 10 may be performed by one or more circuitry described in FIG. 11. In the above examples, the circuitries included in the apparatus 1100 are merely provided as examples, and other means for carrying out the various described functions may be included within various aspects of the present disclosure, including but not limited to the instructions stored in the computer-readable media 1140, or any other suitable apparatus or means described in any one of the figures, and utilizing, for example, the processes and/or algorithms described herein in relation to FIGS. 6, 8 and 10.

Several aspects of DC power management have been presented. As those skilled in the art will readily appreciate, various aspects described throughout the present disclosure may be extended to various types of DC power management on various types of electrical circuitries, components or apparatus.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for DC power management, the method comprising:
   executing a first command, wherein the first command is associated with a unique group tag;
   comparing the unique group tag to a master group tag;
   determining if an interrupt is detected, wherein if the interrupt is detected, all commands associated with the unique group tag are executed prior to executing a second command;
   locking the master group tag to yield a locked master group tag;
   executing the second command, wherein the second command is associated with the locked master group tag;
   determining that an end of commands in the locked master group tag is reached and
   executing a sequence jump through command to put a processor back to a regular power state.

2. The method of claim 1, further comprising:
   organizing a plurality of commands into a sequentially ordered plurality of commands;
   grouping the sequentially ordered plurality of commands into a plurality of groups, wherein each command of the sequentially ordered plurality of commands is associated with a group of the plurality of groups; and
   assigning the unique group tag to one group of the plurality of groups, wherein the first command is a command in the one group.

3. The method of claim 1, further comprising:
   determining that the processor is in the regular power state; and
   measuring a time duration that the processor is in the regular power state.

4. The method of claim 3, further comprising determining if the time duration is greater than a time duration threshold.

5. The method of claim 4, further comprising executing a third command to transition the processor from the regular power state to an idle power state.

6. The method of claim 5, wherein the idle power state consumes less power than the regular power state.

7. The method of claim 6, wherein the idle power state is a shallow low power state.

8. The method of claim 6, wherein the idle power state is a deep low power state.

9. The method of claim 1, further comprising determining if a time duration experienced by the processor is greater than a time duration threshold, wherein the time duration is an amount of waiting time at a shallow low power state.

10. The method of claim 9, further comprising transitioning to an idle power state.

11. The method of claim 10, wherein the idle power state is a deep low power state with a lower power consumption than the shallow low power state.

12. An apparatus configured for DC power management, comprising:
    at least one processor;
    a memory coupled to the at least one processor;
    a time counter coupled to the at least one processor,
    wherein the at least one processor is configured to:
       execute a first command, wherein the first command is associated with a unique group tag;
       compare the unique group tag to a master group tag;
       determine if an interrupt is detected, wherein if the interrupt is detected, all commands associated with the unique group tag are executed prior to executing a second command;

lock the master group tag to yield a locked master group tag;
execute the second command, wherein the second command is associated with the locked master group tag;
determine that an end of commands in the locked master group tag is reached and
execute a sequence jump through command to put a central processing unit (CPU) back to a regular power state.

13. The apparatus of claim 12, wherein the at least one processor is further configured to:
organize a plurality of commands into a sequentially ordered plurality of commands;
group the sequentially ordered plurality of commands into a plurality of groups, wherein each command of the sequentially ordered plurality of commands is associated with a group of the plurality of groups; and
assign the unique group tag to one group of the plurality of groups, wherein the first command is a command in the one group.

14. The apparatus of claim 13, wherein the at least one processor is further configured to:
determine that the CPU is in the regular power state; and
measure a time duration that the CPU is in the regular power state.

15. The apparatus of claim 14, wherein the at least one processor is further configured to:
determine if the time duration is greater than a time duration threshold; and
execute a third command to transition the CPU from the regular power state to an idle power state with less power consumption than the regular power state, if the time duration is greater than the time duration threshold.

16. An apparatus configured for DC power management, comprising:
at least one time counter;
at least one sequencer coupled to the time counter;
means for executing a first command, wherein the first command is associated with a unique group tag;
means for comparing the unique group tag to a master group tag;
means for determining if an interrupt is detected, wherein if the interrupt is detected, all commands associated with the unique group tag are executed prior to executing a second command;
means for locking the master group tag to yield a locked master group tag;
means for executing the second command, wherein the second command is associated with the locked master group tag;
means for determining that an end of commands in the locked master group tag is reached and
means for executing a sequence jump through command to put a processor back to a regular power state.

17. The apparatus of claim 16, further comprising:
means for organizing a plurality of commands into a sequentially ordered plurality of commands;
means for grouping the sequentially ordered plurality of commands into a plurality of groups, wherein each command of the sequentially ordered plurality of commands is associated with a group of the plurality of groups; and
means for assigning the unique group tag to one group of the plurality of groups, wherein the first command is a command in the one group.

18. The apparatus of claim 16, further comprising:
means for determining that the processor is in the regular power state; and
means for measuring a time duration that the processor is in the regular power state.

19. The apparatus of claim 18, further comprising means for determining if the time duration is greater than a time duration threshold.

20. The apparatus of claim 19, further comprising means for executing a third command to transition the processor from the regular power state to an idle power state.

21. The apparatus of claim 20, wherein the idle power state consumes less power than the regular power state.

22. The apparatus of claim 20, wherein the idle power state is a shallow low power state.

23. The apparatus of claim 20, wherein the idle power state is a deep low power state.

24. The apparatus of claim 16, further comprising determining if a time duration experienced by the processor is greater than a time duration threshold, wherein the time duration is an amount of waiting time at a shallow low power state.

25. The apparatus of claim 24, further comprising means for transitioning to an idle power state.

26. The apparatus of claim 25, wherein the idle power state is a deep low power state with a lower power consumption than the shallow low power state.

27. A non-transitory computer-readable medium storing computer executable code, operable on a device comprising at least one processor, and at least one memory coupled to the at least one processor, and the at least one processor configured to manage DC power, the computer executable code comprising:
instructions for causing a computer to execute a first command, wherein the first command is associated with a unique group tag;
instructions for causing the computer to compare the unique group tag to a master group tag;
instructions for causing the computer to determine if an interrupt is detected wherein if the interrupt is detected, all commands associated with the unique group tag are executed prior to executing a second command;
instructions for causing the computer to lock the master group tag to yield a locked master group tag;
instructions for causing the computer to execute the second command, wherein the second command is associated with the locked master group tag;
instructions for causing the computer to determine that an end of commands in the locked master group tag is reached and
instructions for causing the computer to execute a sequence jump through command to put a processor back to a regular power state.

28. The non-transitory computer-readable medium of claim 27, wherein the computer executable code further comprises:
instructions for causing the computer to organize a plurality of commands into a sequentially ordered plurality of commands;
instructions for causing the computer to group the sequentially ordered plurality of commands into a plurality of groups, wherein each command of the sequentially ordered plurality of commands is associated with a group of the plurality of groups; and instructions for causing the computer to assign the unique group tag to one group of the plurality of groups, wherein the first command is a command in the one group.

29. The non-transitory computer-readable medium of claim 27, wherein the computer executable code further comprises:
   instructions for causing the computer to determine that the processor is in the regular power state; and
   instructions for causing the computer to measure a time duration that the processor is in the regular power state.

30. The non-transitory computer-readable medium of claim 29, wherein the computer executable code further comprises:
   instructions for causing the computer to determine if the time duration is greater than a time duration threshold; and
   instructions for causing the computer to execute a third command to transition the processor from the regular power state to an idle power state.

\* \* \* \* \*